(12) United States Patent
Czarnecki

(10) Patent No.: US 8,026,443 B1
(45) Date of Patent: Sep. 27, 2011

(54) PLASTIC ELECTRICAL BOX HAVING A FLUSH MOUNTABLE KNOCKOUT PLUG

(75) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 483 days.

(21) Appl. No.: 12/199,490

(22) Filed: Aug. 27, 2008

(51) Int. Cl.
*H05K 5/03* (2006.01)
*H02G 3/08* (2006.01)

(52) U.S. Cl. ............ 174/66; 174/666; 174/50; 220/3.2; 220/3.3; 220/241

(58) Field of Classification Search .................. 174/480, 174/481, 50, 53, 57, 58, 66, 67, 60, 666; 220/3.2–3.9, 4.02, 241, 242; 439/535, 536
See application file for complete search history.

(56) References Cited

U.S. PATENT DOCUMENTS

| | | | |
|---|---|---|---|
| 4,302,035 A * | 11/1981 | Ochwat ..................... | 174/666 |
| 5,043,536 A * | 8/1991 | DeBartolo, Jr. ............. | 174/666 |
| 5,280,132 A * | 1/1994 | Clarey et al. .............. | 174/50 |
| 5,444,183 A | 8/1995 | Gehrs et al. | |
| 6,242,697 B1 * | 6/2001 | Gerken et al. ............. | 174/666 |
| 6,727,429 B1 | 4/2004 | Koessler | |
| 6,765,147 B1 | 7/2004 | Weiss et al. | |
| 7,041,901 B2 | 5/2006 | Case | |
| 7,109,415 B2 | 9/2006 | Neitzel et al. | |
| 7,353,961 B2 * | 4/2008 | Hull et al. ................. | 220/3.2 |
| 7,575,122 B2 * | 8/2009 | Hull et al. ................. | 220/3.2 |
| 7,586,039 B1 * | 9/2009 | Gretz ....................... | 174/58 |
| 2005/0072778 A1 | 4/2005 | Hull et al. | |

* cited by examiner

*Primary Examiner* — Angel R Estrada
(74) *Attorney, Agent, or Firm* — Boyle Fredrickson, S.C.

(57) ABSTRACT

An electrical enclosure or housing, such as a power inlet box, is constructed of weather resistant material and has a knockout opening formed in a wall member and a plug that can be removably seated in the knockout opening. The opening and the plug have complimentary geometries and thicknesses which enable the plug to be mounted flush with the exterior and interior wall surfaces of the wall member when seated in the knockout opening. The opening and plug are shaped such that a seated plug is normally removed by applying a blunt force to the plug from within the interior volume of the inlet box, and cannot be removed from the exterior of the box.

24 Claims, 6 Drawing Sheets

PLASTIC ELECTRICAL BOX HAVING A FLUSH MOUNTABLE KNOCKOUT PLUG

FIELD OF THE INVENTION

The present invention is generally directed to a housing for electrical components, such as but not limited to a power inlet box, which may be mounted to a wall of a building, and more particularly, to a plastic electrical housing or box having a removable plug adapted to be flush mounted within a knockout opening in a manner that limits normal removal of the plug to the application of a force to the plug from within the interior of the electrical box.

BACKGROUND OF THE INVENTION

Prior art electrical boxes are made from sheet metal in which a sharply defined shearing force normal to the surface of a wall member of the box is applied in a restrained manner to form a knockout area. The knockout area formed in this manner is typically in the form of a perforated depression in the surface of the wall member. A user can apply a force to the perforated depression to break the depression away from the wall member to form a knockout opening.

Metal electrical boxes have certain drawbacks, e.g. rust and corrosion, and more weather-resistant materials, such as plastic, offer advantages over metal electrical boxes.

A number of knockout forming techniques have been developed to allow a user to remove a portion of the wall member, e.g., a plug, to reveal or form a knockout opening. For example, stress concentration tabs may be used to initially hold the plug in the knockout opening. To remove the plug, a user simply breaks the tabs. This is generally accomplished by punching the plug into the interior volume of the electrical box.

Knockouts in which the plug is held in place by stress concentration tabs have a number of drawbacks. For instance, the plug does not seal the interior volume of the electrical box against precipitation. Also, once the plug is removed, it cannot be reattached to the wall member to effectively close the knockout opening. Further, the tabs allowed the plug to be removed by applying a punching force from outside the electrical box to force the plug inwardly into the interior volume of the electrical box. This allows the plug to be removed without having access to the interior volume of the electrical box, which creates the potential for tampering with the interior of the box.

SUMMARY OF THE INVENTION

The present invention is directed to a plastic housing or box for electrical components, which is suitable for either indoor or outdoor use that overcomes the aforementioned drawbacks. The housing or box has a knockout opening formed in a wall member and a plug that can be removably seated in the knockout opening. The opening and the plug have complimentary geometries and thicknesses which enable the plug to be mounted flush with the exterior and interior wall surfaces of the wall member when seated in the knockout opening. This effectively seals the knockout opening when the plug is seated in the opening, without requiring a separate seal. The complimentary geometries restrict normal unseating of the plug from the knockout opening to application of a force to the plug from within the interior of the housing or box. The complimentary geometries increase the surface area contact of the plug and the knockout opening, thus providing a watertight, tightly-held seating of the plug within the knockout opening. The geometries of the plug and the knockout opening are unaffected by the removal of the plug from the knockout opening.

It is thus an object of the present invention to provide a housing or box in which the interior volume of the box is sealed against rain, snow, and similar weather related conditions. It is a further object of the present invention to have an electrical housing or box in which unauthorized access to the interior volume of the housing or box is restricted. It is yet another object of the present invention to provide an electrical housing or box in which unintentional or accidental removal of the plug from the knockout opening is prevented. It is another object of the present invention to provide a housing or box in which the plug can be removed from the knockout opening without shearing of the plug from the wall of the housing or box. It is also an object to provide an electrical housing or box in which the plug is not initially held in the knockout opening using molded stress concentrators that must be broken before the plug can be removed from the knockout opening.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
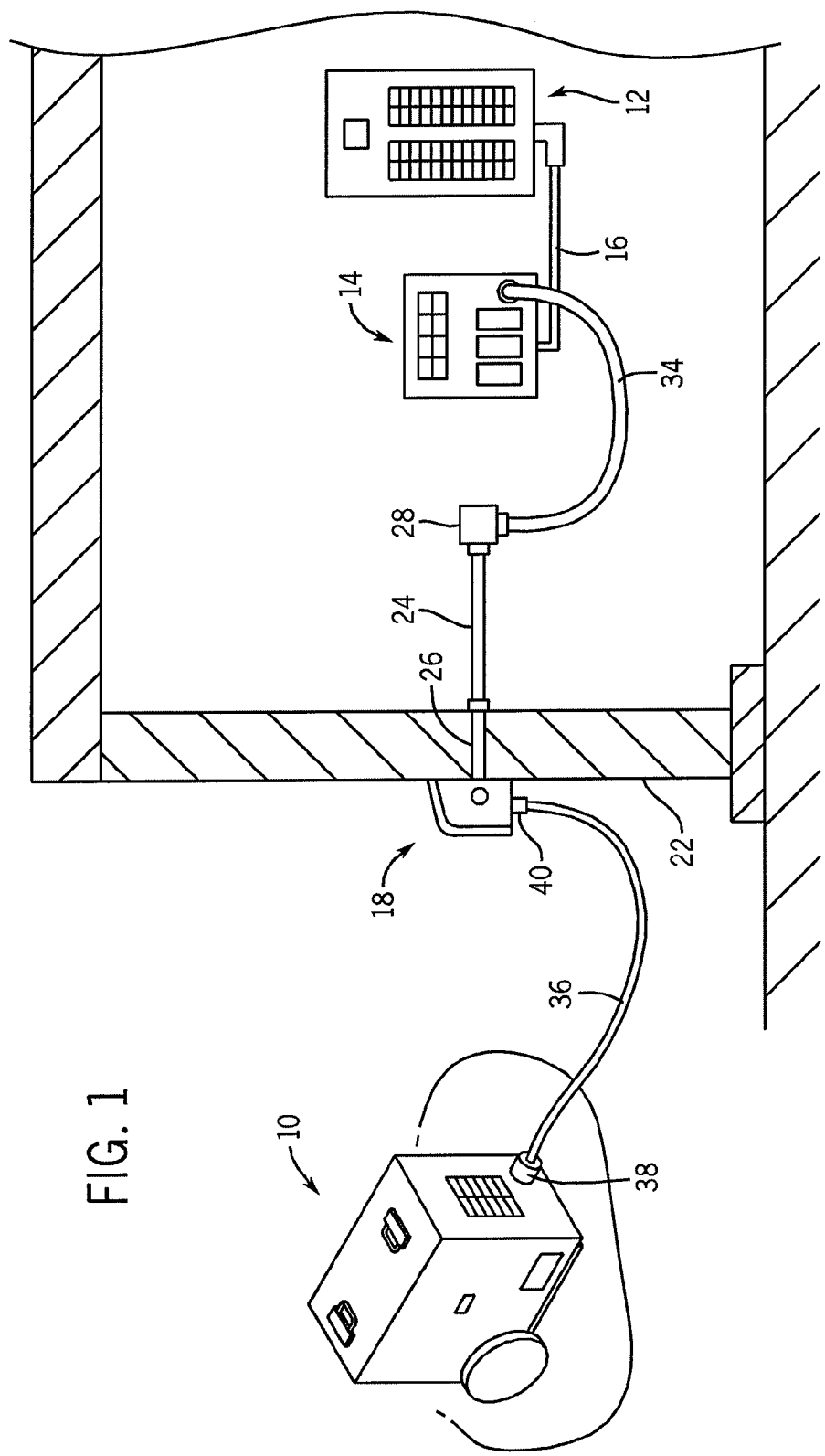
FIG. 1 is a partial section view showing a representative application for an electrical housing or box in accordance with the present invention, in the form of a building showing interconnection of a remote power generator with the main electrical panel of the building using the a power inlet box constructed in accordance with the present invention.

FIG. 1 illustrates a system for interconnecting a remote power generator 10 with the main electrical distribution panel or load center 12 of a building. A manual transfer panel 14 is mounted to the building interior wall adjacent main panel 12, and is connected to main panel 12 via wiring disposed within a conduit 16 extending therebetween, in a manner as is known. Alternately, the transfer panel 14 may be an automatic transfer panel, as is known in the art. A power inlet box 18, which is constructed in accordance with the present invention, is mounted to the exterior of a building wall, shown at 22.

It is to be emphasized and understood at the outset that the present invention contemplates any type of enclosure, housing or box for enclosing electrical components, and that the invention is not limited to a power inlet box as shown and described. Rather, it is understood that the power inlet box 18 is but one example of a housing, enclosure or box that can be constructed in accordance with the present invention.

In the illustrated embodiment, a conduit 24 extends from the interior of building wall 22, and is interconnected with power inlet box 18 via any satisfactory, conventional wire routing structure, such as a conduit 26 extending through wall 22 for interconnection with conduit 24. A junction box 28 is mounted to the interior wall of the building, and a flexible cord 34 is attached to junction box 28. Flexible cord 34 has a plug which is engageable with a power inlet receptacle provided on transfer panel 14, to complete the electrical connection between power inlet box 18 and manual transfer panel 14 for supplying power to main panel 12 in the event of a power outage or the like. Alternatively, cord 34 may be replaced with wiring contained within a conduit or sheath, to provide a wired connection between power inlet box 18 and transfer panel 14 rather than a plug-type connection. In addition, it is understood that power inlet box 18 may be mounted in any desired location on the building, e.g. on the interior wall, and is not limited to securement to the exterior wall of the building as shown.

A flexible cord 36 includes a plug 38 at one end which is engageable with the power outlet of generator 10. At its opposite end, cord 36 includes a connector 40 engageable with power inlet box 18 for supplying power to power inlet box 18 from generator 10. When cord 36 is installed in this manner, auxiliary power supplied by generator 10 is transferred to manual transfer panel 14 through inlet box 18 and the wiring in conduit 26, conduit 24, junction box 28 and cord 34 to transfer panel 14. The wiring in conduit 16 transfers power to selected circuits of main panel 12 according to the position of certain switches on transfer panel 14, so as to provide power to such circuits in the event of a power outage, in a manner as is known.

Figure 2:
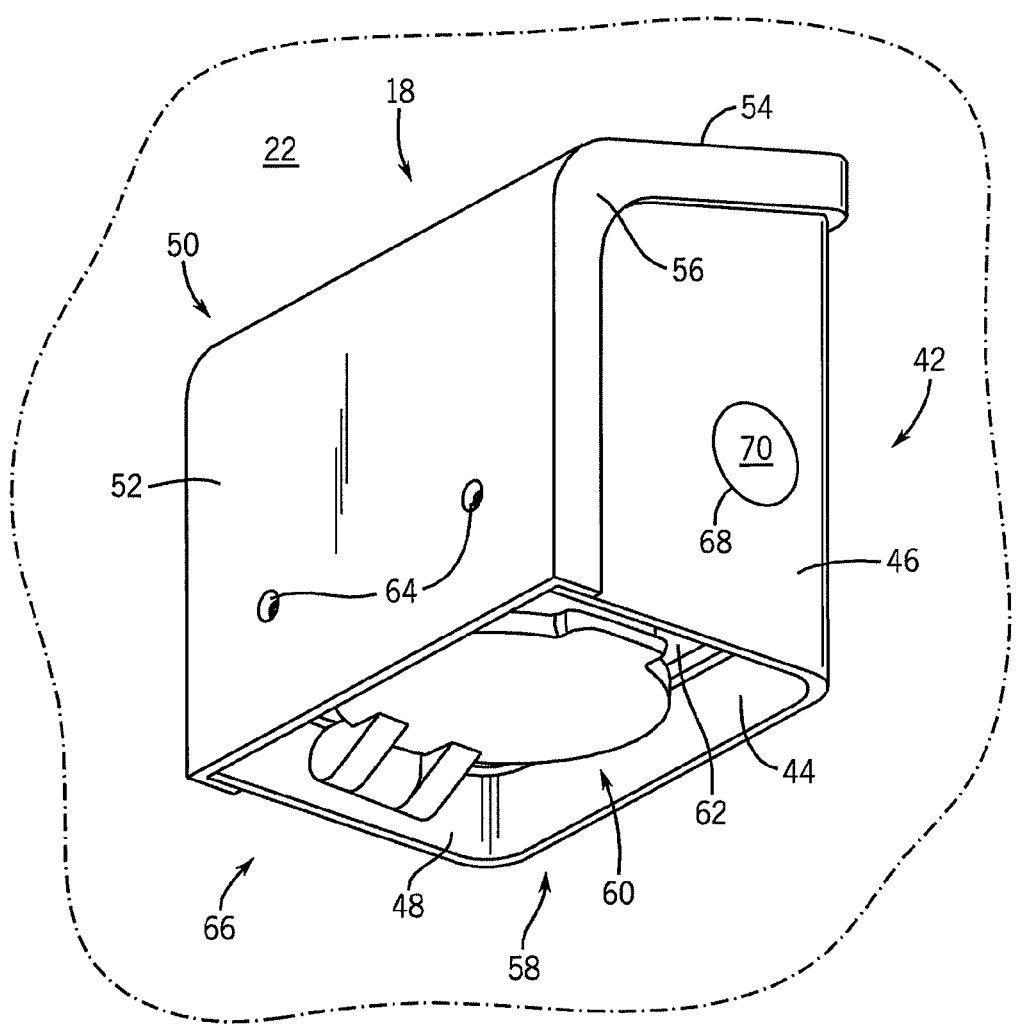
FIG. 2 is an isometric view of the power inlet box of FIG. 1 shown mounted to an exterior wall of the building.

Referring now to FIG. 2, the power inlet box 18 in accordance with one representative embodiment the invention includes a base or frame 42 that is defined by a rear wall 44, a first sidewall 46, and a second sidewall 48. In one embodiment, the rear wall 44 and sidewalls 46, 48 are integrally formed as a single unit such that no seams are formed between the rear wall 44 and each sidewall 46, 48. When assembled, the power inlet box 18 further includes a cover 50 defined by a front wall 52 and a top 54. In a preferred embodiment, the cover 50 is formed as a single unit such that there is no seam between the front wall 52 and the top 54. In the illustrated embodiment, the front wall 52 and the top 54 also include an integral side flange 56 at each side, and each side flange 56 is configured to overlie the upper end portion and outer end portion of one of frame sidewalls 46, 48. Representatively, frame 42 and cover 50 may be formed of a thermoplastic material in an injection molding process, although it is understood that any other satisfactory material and forming method may be employed.

When assembled, the cover 50 fits onto the frame 42 such that the top 54 of cover 50 rests atop the rear wall 44 and the sidewalls 46, 48 of frame 42. The front wall 52 of the cover 50 engages the outer edges of the sidewalls 46, 48 generally perpendicular to the plane of the top 54. Collectively, the frame 42 and the cover 50 define an interior volume 58 in which an electrical socket 60 may be removably mounted. As will be described more fully below, the electrical socket 60 is secured to and carried by a mounting member, in the form of a mounting plate 62, which is mounted to an interior surface of the frame 42. Holes 64 formed in the front wall 52 of the cover 50 align with passages formed in the mounting plate 62 which, in turn, align with openings formed in the rear wall 44 of the frame 42. Fasteners such as screws or bolts, may be inserted through the front holes 64 and the passages to secure the mounting plate 62 and the cover 50 to the frame 42. As shown in FIG. 2, the electrical socket 60 is recessed from an exposed bottom end 66 of the power inlet box 18. The exposed bottom end 66 is code-compliant because the power inlet box 18 is designed to be mounted with the rear wall 44 generally flush against the surface of an exterior wall (not shown) of the building. With this orientation, the bottom end 66 faces downward. Thus, any precipitation falls along the exterior surfaces of the side walls of the frame and the front wall of the cover and not into the interior of the power inlet box 18 or into contact with socket 60.

Sidewall 46 includes a knockout opening 68 in which a removable plug 70 may be seated. As known in the art, knockout openings, such as opening 68, may be used to route electrical conduit, such as conduit 24, into the interior volume 58 of the inlet box 18 to couple electrical conductors shrouded within the conduit to the electrical socket 60. In the representative power inlet box 18 shown in FIG. 2, the knockout opening 68 is not being used and is thus closed using a removable plug 70. In this regard, similar knockout openings (not shown) are formed in the rear wall 44 of the frame 42 and are used to route electrical conductors into the interior volume 58 of the power inlet box 18.

The structure and functionality of the power inlet box described herein is further described in U.S. Ser. No. 12/026,133, and entitled, "POWER INLET BOX WITH REMOVABLE SOCKET MOUNTING MEMBER", the disclosure of which is incorporated herein by reference. It is understood however that the present invention is not limited to such a power inlet box and is thus applicable with differently constructed power boxes, including power outlet boxes used to enclose an electrical socket adapted to electrically connect a load to a power supply.

Figure 3:
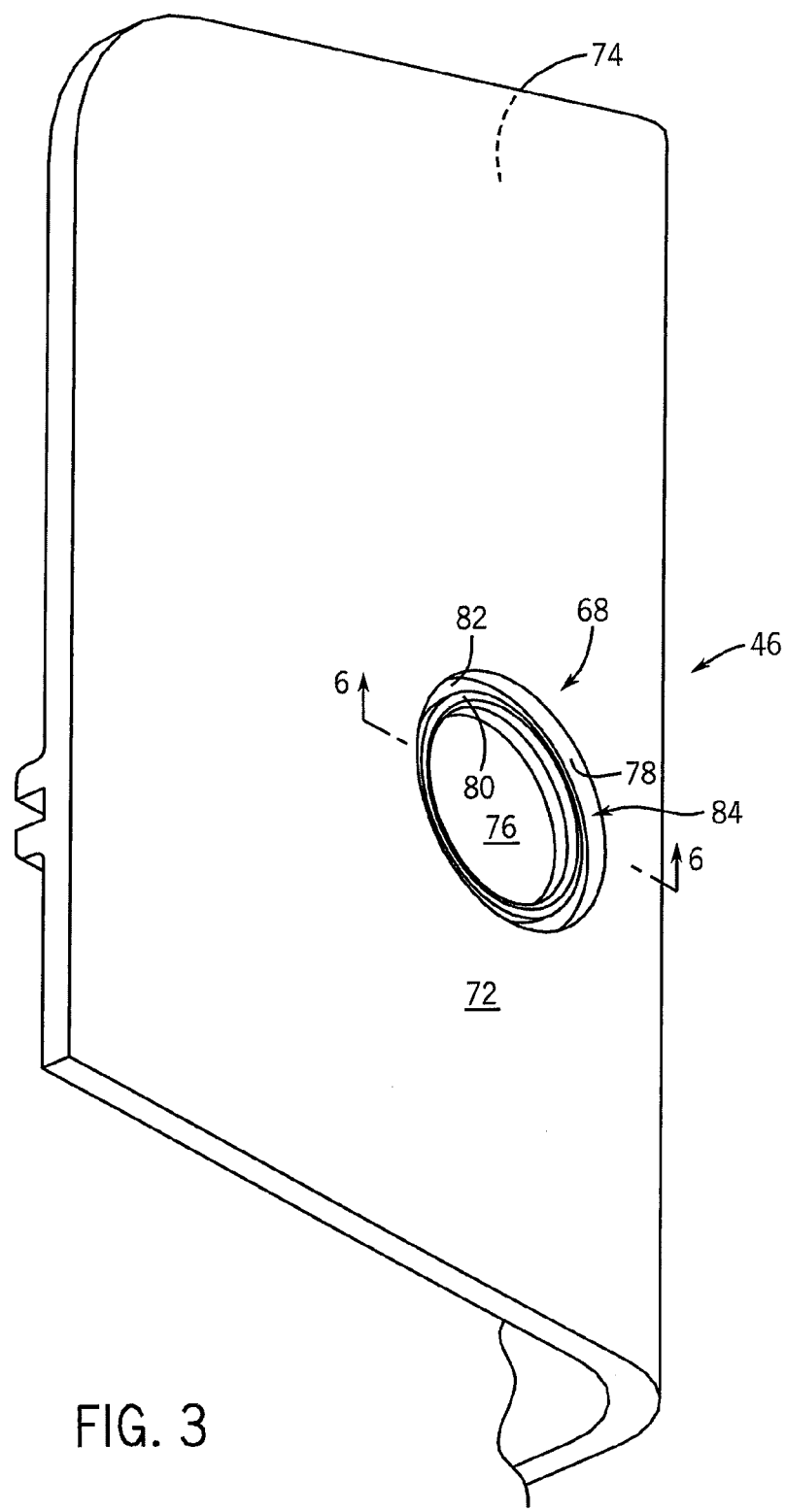
FIG. 3 is a front isometric view of a wall member of the power inlet box shown in FIG. 2.
Figure 4:
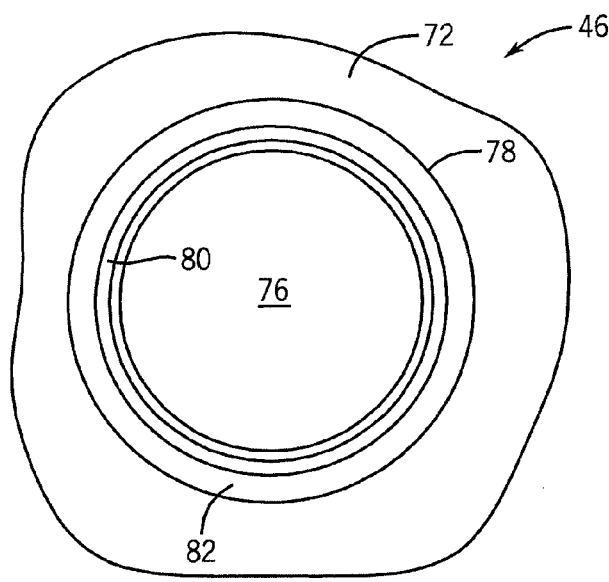
FIG. 4 is a front elevation view of the wall member shown in FIG. 3.

Referring now to FIG. 3, sidewall 46 includes a body 71 having an exterior planar surface 72 and an interior planar surface 74. Knockout opening 68 defines a passage 76 between the exterior planar surface 72 and the interior planar surface 74. With additional reference to FIGS. 4 and 6, an outer annular wall 78 having a first diameter, D, is formed in the exterior planar surface 72. The annular wall 78 is formed inwardly into the body 71 toward the interior planar surface 74. Spaced from the outer annular wall 78 is an inner annular wall 80 having a second diameter, d, smaller than that of the outer annular wall 78. An annular shoulder 82 interconnects the outer annular wall 78 and the inner annular wall 78. The inner annular wall 80 is recessed within the opening defined by the outer annular wall 78. Thus, a groove 84 is effectively formed between the outer annular wall 78 and the inner annular wall 80. As will be described, the groove 84 provides a seat for a portion of the plug 70 when the plug 70 is seated in the opening 68.

Figure 5:
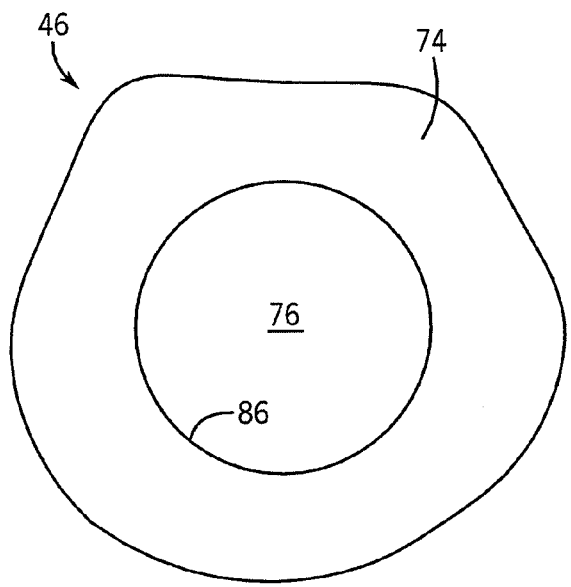
FIG. 5 is a rear elevation view of the wall member shown in FIG. 3.

The inner annular wall 80 has an inward edge 86 that effectively defines the diameter of the opening 76 through the interior planar surface 74, as further shown in FIG. 5. Since the diameter of the inner annular wall 80 is less than the diameter of the outer annular wall 78, the diameter of the opening through the exterior planar surface 72 is larger than the diameter of the opening through the interior planar surface 74.

Figure 7:
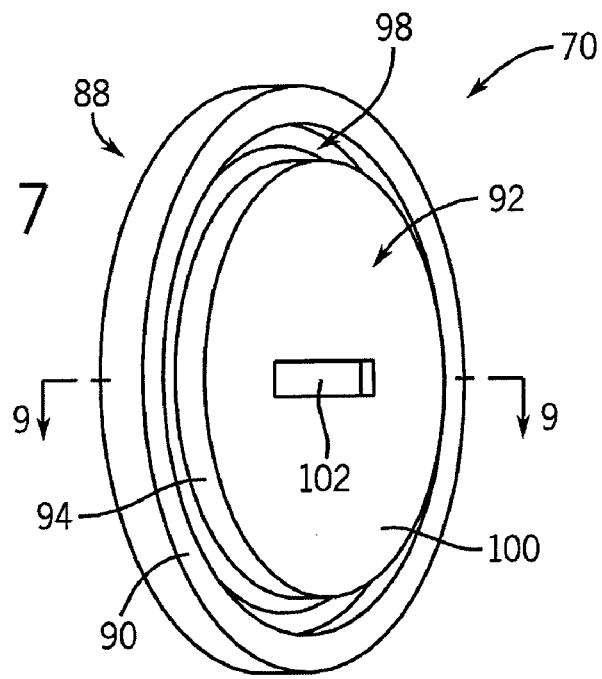
FIG. 7 is a rear isometric view of the removable plug shown in FIG. 2.
Figure 8:
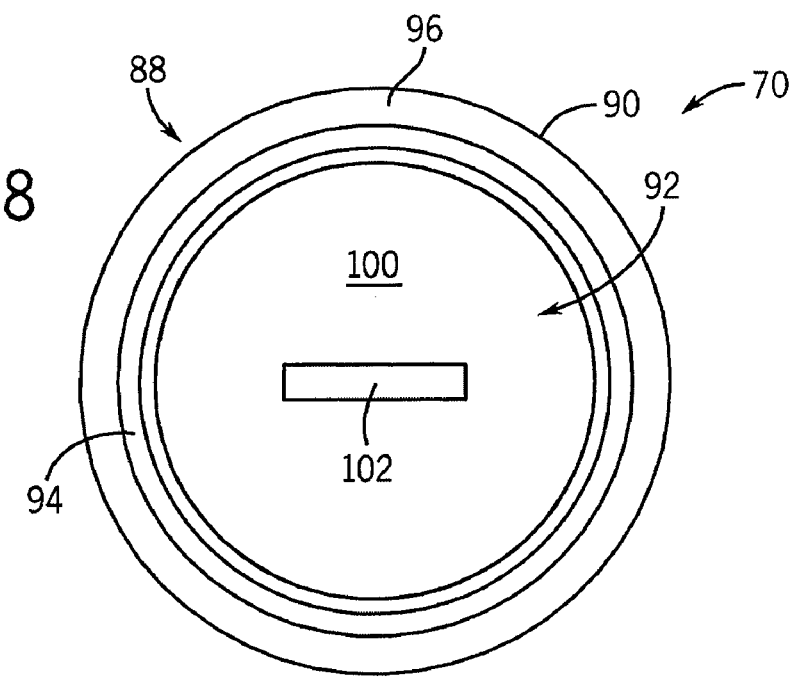
FIG. 8 is a rear elevation view of the removable plug shown in FIG. 7.

When not being used to pass conduit, it is preferred that the knockout opening 68 is closed using plug 70. The plug 70, shown in FIGS. 7-9, has a generally circular cap 88 defined by an outer annular wall 90 and a cylindrical body 92 defined by an inner annular wall 94. The cylindrical body 92 is preferably integrally formed with the cap 88 yet the inner annular wall 94 is spaced from the outer annular wall 90 by an annular shoulder 96 that effectively forms an annular groove 98 between walls 90, 94. The cylindrical body 92 includes a circular shaped, planar face 100 that is constructed to have a tool receiving notch 102.

Figure 6:
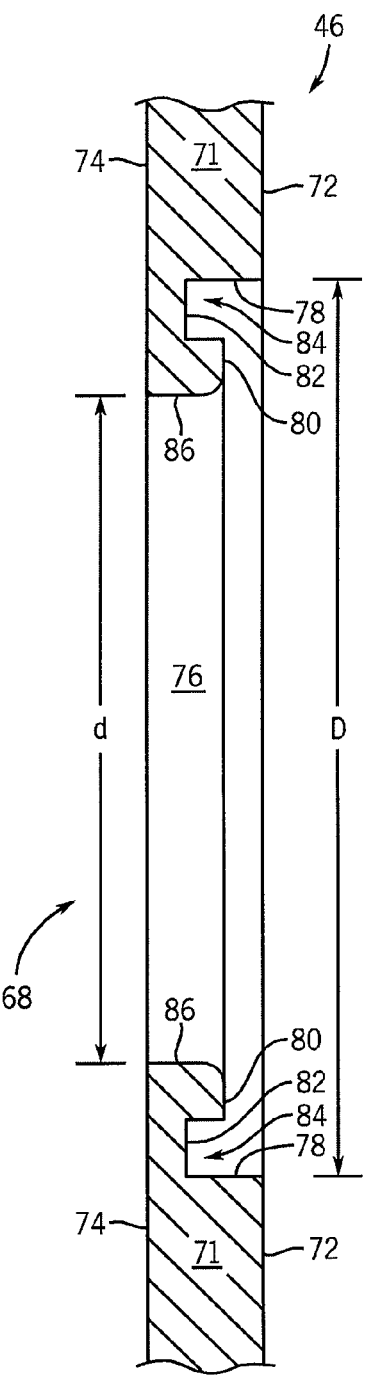
FIG. 6 is a section view of the wall member taken along line 6-6 of FIG. 4.
Figures 9, 10:
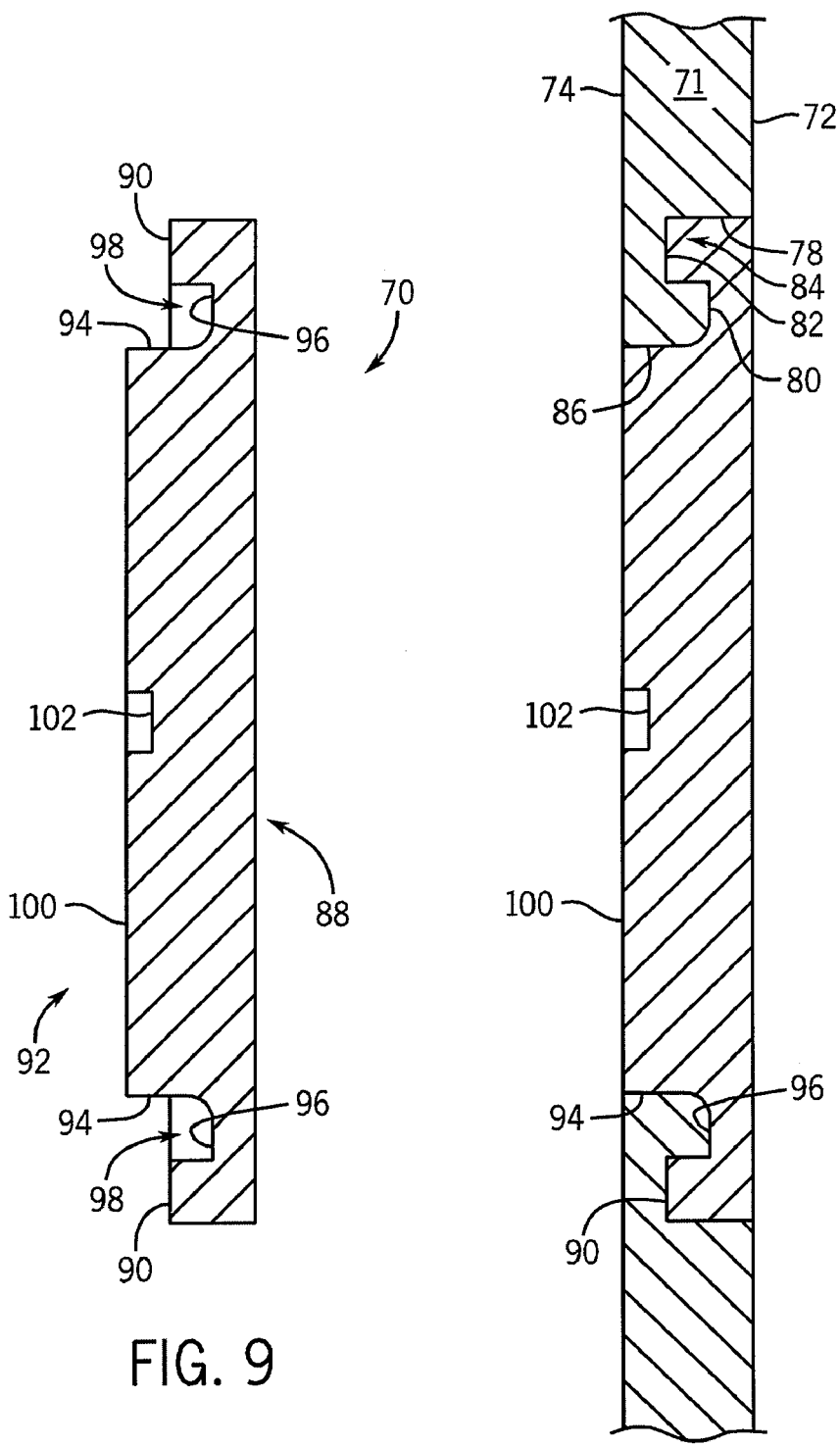
FIG. 9 is a section view of the plug taken along line 9-9 of FIG. 7.
FIG. 10 is a section view of wall member shown in FIG. 3 with the removable plug of FIG. 7 seated in a knockout opening formed in the wall member.

The plug 70, which is preferably formed of the same material as the sidewall 46, e.g., weather and corrosion resistant plastic, is constructed to be tightly held in the knockout opening 68 when the knockout opening 68 is not being used to route electrical conduit to the interior volume 58 of the box 18. As shown in FIGS. 6 and 9, the opening 68 and the plug 70 have complimentary serpentine edges that effectively provide a greater contact surface area between the plug 70 and the sidewall 46.

Further, the complimentary geometry of the opening 68 and the plug 70 limits seating of the plug into the opening from the exterior of the sidewall 46 and, conversely, limits unseating of the plug from the opening to the application of a force applied from within the interior volume 58 of the box 18. More particularly, when the plug 70 is seated into the opening 68, the outer annular wall 90 of the plug 70 fits snugly within the groove 84 formed between the outer annular wall 82 and the inner annular wall 80 that define opening 68. Similarly, the inner annular wall 80 seats in groove 98 of the plug 70. This construction restricts movement of the plug inwardly into the interior volume 58 of the box 18. Thus, to remove the plug 70, a force must be applied onto the plug from within the interior volume 58, such as with the aid of a tool (not shown) inserted into notch 102. In this regard, the plug 70 cannot be accidentally or unintentionally punched through into the interior volume 58 of the box 18.

Additionally, in one preferred embodiment, the thickness of the wall body 71 and the plug are substantially equal. Having equal thicknesses allows the plug 70 to be mounted flush with both the exterior surface 72 and the interior surface 74 of the sidewall body 71, as illustrated in FIG. 10. This flush mounting prevents the plug 70 from being accessed from exterior when the plug 70 is seated in the opening 68.

Preferably, the power inlet box 18 is constructed of weather resistant plastic. It is recognized that a number of different fabrication techniques, including injection molding, may be used and the invention is not limited to any particular known or to be developed fabrication technique. As noted above, while the invention has been shown and described in connection with a power inlet box, it is understood that the invention may be used in connection with any type of electrical housing, enclosure or box in which a knockout opening is desired, such as, but not limited to, a load center cabinet, transfer switch enclosure, transfer panel cabinet, or any other type of enclosure for electrical components which are adapted to be connected to one or more wires or cables from the outside of the enclosure.

Various alternatives and modifications are contemplated as being within the scope of the following claims, which particularly point out and distinctly claim the subject matter regarded as the invention.

I claim:

1. An electrical enclosure comprising:
   a plastic housing having a wall member defining an inner surface and an outer surface;
   a knockout opening formed in the wall member, wherein the wall member defines an annular recess that surrounds the knockout opening, wherein the annular recess is defined in part by an outer wall and a floor;
   an annular rim defined by the wall member, wherein the annular rim is located within the recess and surrounds the knockout opening and extends outwardly from the floor of the recess at a location spaced inwardly from the outer wall of the recess; and
   a plug removably engaged with the wall member within the recess, wherein the plug is configured to cover the knockout opening and defines an outwardly facing surface and an inwardly facing surface, wherein the inwardly facing surface includes an annular groove within which the annular rim is engaged, and wherein the plug and the annular recess define a serpentine interface, which includes an interface between the annular rim and the annular groove, between the outer surface of the wall member and the inner surface of the wall member at the knockout opening.

2. The electrical enclosure of claim 1 wherein the outwardly facing surface of the plug is flush with the outer surface of the wall member when the plug is seated in the knockout opening.

3. The electrical enclosure of claim 1 wherein the housing has a plurality of other wall members that together with the first-mentioned wall member define an interior volume and wherein the plug is normally removable from a seated position in the knockout opening by an application of a force against the plug applied from within the interior volume.

4. The electrical enclosure of claim 3 wherein the plug is normally seated by application of a second force opposite in direction to the first-mentioned force on the plug from exteriorly of the interior volume.

5. An electrical enclosure comprising:
   a plastic housing having a wall member;
   a knockout opening formed in the wall member, the knockout opening having:
      an outer annular wall defining a first recess;
      an inner annular wall defining a second recess, the inner wall recessed within the first recess; and
      a shoulder extending between the outer annular wall and the inner annular wall such that a first groove is formed between the inner annular wall and the outer annular wall; and
   a plug removably seated in the knockout opening, wherein the plug comprises:
      a cap member and
      a cylindrical body extending from the cap member such that a second groove is formed between the cylindrical body and the cap member;
      wherein the cylindrical body is adapted to be received within the second recess and the cap member is adapted to be received within the first recess when the plug is seated in the knockout opening.

6. The electrical enclosure of claim 5 wherein the wall member has an interior wall surface and an exterior wall surface and wherein the cap member is adapted to be flush with the exterior wall surface and the cylindrical body is adapted to be flush with the interior wall surface when the plug is seated in the knockout opening.

7. The electrical enclosure of claim 5 wherein the cap member includes an annular wall adapted to fit within the first groove when the plug is seated in the knockout opening.

8. The electrical enclosure of claim 5 wherein the second groove is adapted to receive the inner annular wall when the plug is seated in the knockout opening.

9. The electrical enclosure of claim 5 wherein the cylindrical body includes a generally planar face and further comprising a tool-engaging notch formed in the generally planar face.

10. The electrical enclosure of claim 5 wherein the housing has a plurality of other wall members that together with the first-mentioned wall member define an interior volume and wherein the plug is normally removable from a seated position in the knockout opening by an application of a force against the plug applied from within the interior volume.

11. The electrical enclosure of claim 5 wherein the plug is normally seated by application of a second force opposite in direction to the first-mentioned force on the plug from exteriorly of the interior volume.

12. A plastic electrical enclosure for housing an electrical component, the enclosure comprising:
    a plastic housing having at least one generally planar wall member;
    a opening formed in the wall member, wherein the wall member defines an annular recess that surrounds the opening, wherein the annular recess includes a floor; and
    a plastic plug removably seated within the opening, wherein the plug is configured to cover the opening and defines an outwardly facing surface and an inwardly facing surface;
    wherein the floor of the recess includes a first serpentine surface and the inwardly facing surface of the plastic plug has serpentine configuration that interfits with the first serpentine surface, wherein the first serpentine surface of the recess floor and the serpentine configuration of the inwardly facing surface of the plastic plug form a serpentine interface between the plug and the wall member between the outer surface of the wall member and the inner surface of the wall member at the opening.

13. The plastic electrical enclosure of claim 12, wherein the wall member has a first thickness and the plastic plug has a second thickness generally equal to the first thickness.

14. The plastic electrical enclosure of claim 12 wherein the first serpentine surface is defined by a first outer wall, a first inner wall, and a first shoulder extending between the first outer wall and the first inner wall so as to form a first annular groove, and wherein the serpentine configuration of the inwardly facing surface of the plastic plug is defined by a second outer wall, a second inner wall, and a second shoulder extending between the second outer wall and the second inner wall so as to form a second annular groove, and wherein the second outer wall is received within the first annular groove when the plastic plug is seated in the recess.

15. The plastic electrical enclosure of claim 14 wherein the recess is defined by the first outer wall and the opening is defined by the first inner wall and is smaller in transverse dimension than the recess, and wherein the plastic plug comprises a cylindrical body having an outer transverse dimension defined by the second inner wall and wherein the cylindrical body is sized to be received within the opening.

16. The plastic electrical enclosure of claim 15 wherein the serpentine configuration of the inwardly facing surface of the plastic plug is defined by a generally planar face of the plastic plug with a notch formed therein.

17. The plastic electrical enclosure of claim 12 wherein the plastic housing has a plurality of other generally planar wall members that together with the first-mentioned generally planar wall member define an interior volume and wherein the plastic plug is normally removable from a seated position in the opening by an application of a force against the face of the plastic plug applied from within the interior volume.

18. A plastic electrical enclosure for housing an electrical component, the enclosure comprising:
    a plastic housing having at least one generally planar wall member;
    an opening formed in the wall member; and
    a plastic plug adapted to be removably seated within the opening;
    wherein the opening is defined by a first serpentine edge formed in the wall member and the plastic plug has a second serpentine edge that interfits with the first serpentine edge, wherein the first serpentine edge is defined by a first outer wall, a first inner wall, and a first shoulder extending between the first outer wall and the first inner wall so as to form a first annular groove, and wherein the second serpentine edge is defined by a second outer wall, a second inner wall, and a second shoulder extending between the second outer wall and the second inner wall so as to form a second annular groove, and wherein the second outer wall is received within the first annular groove when the plastic plug is seated in the opening.

19. The plastic electrical enclosure of claim 18 wherein the opening includes a first opening defined by the first outer wall and a second opening, smaller in diameter than the first opening, defined by the first inner wall, and wherein the plastic plug comprises a cylindrical body having an outer diameter defined by the second inner wall, and wherein the cylindrical body is sized to be received within the second opening.

20. The plastic electrical enclosure of claim 19 wherein the cylindrical body has a generally planar face with a notch formed therein.

21. The plastic electrical enclosure of claim 20 wherein the plastic housing has a plurality of other generally planar wall members that together with the first-mentioned generally planar wall member define an interior volume and wherein the plastic plug is normally removable from a seated position in the opening by an application of a force against the face of the plastic plug applied from within the interior volume.

22. A housing for enclosing an electrical component, the housing comprising:
    a plurality of wall members, each wall member having an exterior surface and an interior surface;
    a knockout opening formed in one of the wall members, wherein the wall member defines an annular recess that surrounds the knockout opening, wherein the annular recess includes a floor; and
    a removable plug removably seated within the knockout opening, and wherein the removable plug is configured to cover the knockout opening and defines an outwardly facing surface and an inwardly facing surface;
    wherein the floor of the recess includes a first serpentine surface and the inwardly facing surface of the plug has a serpentine configuration that interfits with the first serpentine surface, wherein the first serpentine surface of the recess floor and the serpentine configuration of the inwardly facing surface of the plug form a serpentine interface between the plug and the wall member between the exterior surface of the wall member and the interior surface of the wall member at the opening.

23. The housing of claim 22 wherein the outwardly facing surface of the plug is flush with the exterior surface of the wall member when the plug is seated within the knockout opening.

24. The housing of claim 22 wherein the plurality of wall members collectively define an interior volume and wherein the removable plug is normally only removable from the knockout opening by application of a force to the plug from within the interior volume.

* * * * *

UNITED STATES PATENT AND TRADEMARK OFFICE
CERTIFICATE OF CORRECTION

| | | |
|---|---|---|
| PATENT NO. | : 8,026,443 B1 | Page 1 of 1 |
| APPLICATION NO. | : 12/199490 | |
| DATED | : September 27, 2011 | |
| INVENTOR(S) | : Neil A. Czarnecki | |

It is certified that error appears in the above-identified patent and that said Letters Patent is hereby corrected as shown below:

CLAIM 3, column 6, line 34, delete "other" and substitute therefore -- outer --;

CLAIM 10, column 7, line 14, delete "other" and substitute therefore -- outer --;

CLAIM 12, column 7, line 36, after "has" insert -- a --.

Signed and Sealed this
Eighth Day of November, 2011

David J. Kappos
*Director of the United States Patent and Trademark Office*